United States Patent
Pu

(10) Patent No.: US 9,981,184 B2
(45) Date of Patent: May 29, 2018

(54) METHOD AND SYSTEM FOR INVOKING PLUG-IN FUNCTION

(71) Applicant: TENCENT TECHNOLOGY (SHENZHEN) COMPANY LIMITED, Shenzhen, Guangdong Province (CN)

(72) Inventor: Donglin Pu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 949 days.

(21) Appl. No.: 14/287,654

(22) Filed: May 27, 2014

(65) Prior Publication Data

US 2014/0370990 A1  Dec. 18, 2014

Related U.S. Application Data

(63) Continuation of application No. PCT/CN2014/073835, filed on Mar. 21, 2014.

(30) Foreign Application Priority Data

Jun. 17, 2013  (CN) .................. 2013 1 02397073

(51) Int. Cl.
- *A63F 13/30* (2014.01)
- *A63F 13/69* (2014.01)
- *A63F 13/77* (2014.01)

(52) U.S. Cl.
CPC .............. *A63F 13/30* (2014.09); *A63F 13/69* (2014.09); *A63F 13/77* (2014.09); *A63F 2300/552* (2013.01)

(58) Field of Classification Search
CPC .......... A63F 13/30; A63F 13/12; A63F 13/69; A63F 13/77; A63F 2300/552
(Continued)

(56) References Cited

U.S. PATENT DOCUMENTS 8,019,811 B1 * 9/2011 Britto .................... G06F 9/542
709/203
8,578,329 B1 * 11/2013 Chiluvuri ................ G06F 8/36
717/106
(Continued)

FOREIGN PATENT DOCUMENTS

CN        101895431 A       11/2010
CN        102339291 A        2/2012
(Continued)

OTHER PUBLICATIONS

State Intellectual Property Office of the P.R. China (ISR/CN), "International Search Report for PCT/CN2014/073835", China, dated Jun. 27, 2014.
(Continued)

*Primary Examiner* — Michael Cuff
(74) *Attorney, Agent, or Firm* — Tim Tingkang Xia, Esq.; Locke Lord LLP

(57) ABSTRACT

A method and a device for invoking a plug-in function are disclosed, which relate to the technical field of wed games. The method includes: detecting whether there exists a need to execute a function of a preset plug-in in an online game, and if there exists the need to execute the function of the preset plug-in in the online game, acquiring a type of a browser on which the online game is played; when the browser on which the online game is played is a non-IE browser, acquiring the preset plug-in and instantiating a refresh-free plug-in instance according to the preset plug-in; and invoking the refresh-free plug-in instance in the online game, and executing a function of the preset plug-in. Through the present invention, it is not required to refresh a webpage in an IE browser, and the function of the preset plug-in can be executed by instantiating the refresh-free
(Continued)

plug-in instance, thereby improving the execution efficiency of the webpage.

15 Claims, 3 Drawing Sheets

(58) Field of Classification Search
USPC .......................................................... 463/42
See application file for complete search history.

(56) References Cited

U.S. PATENT DOCUMENTS

| | | | | |
|---|---|---|---|---|
| 8,898,325 | B2* | 11/2014 | Lee | A63F 13/12 463/42 |
| 9,219,842 | B1* | 12/2015 | Xu | H04N 1/32144 |
| 9,898,739 | B2* | 2/2018 | Monastyrsky | G06Q 20/382 |
| 2002/0095460 | A1 | 7/2002 | Benson | |
| 2003/0078965 | A1* | 4/2003 | Cocotis | H04L 29/06 709/203 |
| 2004/0260933 | A1* | 12/2004 | Lee | G06F 21/14 713/193 |
| 2007/0050386 | A1* | 3/2007 | Busey | G06F 17/30067 |
| 2007/0082738 | A1* | 4/2007 | Fickie | A63F 13/12 463/42 |
| 2008/0177994 | A1* | 7/2008 | Mayer | G06F 9/4418 713/2 |
| 2009/0013284 | A1* | 1/2009 | Chen | G06F 17/30017 715/810 |
| 2009/0254912 | A1* | 10/2009 | Roundtree | G06F 8/61 718/102 |
| 2009/0298582 | A1* | 12/2009 | Dempsky | A63F 13/12 463/29 |
| 2010/0088740 | A1* | 4/2010 | Waters | G06Q 50/20 726/1 |
| 2014/0337816 | A1* | 11/2014 | Chiluvuri | G06F 8/36 717/107 |

FOREIGN PATENT DOCUMENTS

| | | |
|---|---|---|
| CN | 103064886 A | 4/2013 |
| CN | 102647398 A | 8/2013 |
| CN | 103309741 A | 9/2013 |

OTHER PUBLICATIONS

Xin Cui, Development and Application of Silverlight Technology, Computer Knowledge and Technology, Aug. 2009, pp. 6194, 6195 and 6200, vol. 5, No. 22.

Yu Chang et al., Design and Implementation of Geographical CAI Courseware Based on Google Maps API, Journal of Xinyang Normal University, Natural Science Edition, Jul. 2011, pp. 410-413, vol. 24, No. 3.

State Intellectual Property Office of the P.R. China, "First Chinese Office Action and Search Report for 2013102397073", China, dated Feb. 28, 2015.

State Intellectual Property Office of the P.R. China, "Second Chinese Office Action and Search Report for 2013102397073", China, dated Sep. 1, 2015.

* cited by examiner

METHOD AND SYSTEM FOR INVOKING PLUG-IN FUNCTION

CROSS-REFERENCE TO RELATED APPLICATION

This application is a continuation application of International Patent Application No. PCT/CN2014/073835, filed Mar. 21, 2014, which itself claims the priority to Chinese Patent Application No. 201310239707.3, filed on Jun. 17, 2013 in the State Intellectual Property Office of P.R. China, which are hereby incorporated herein in their entireties by reference.

FIELD OF THE INVENTION

The present invention relates generally to the field of playing online games, and more particularly, to method and system for invoking plug-in functions without refreshing the webpage, and a non-transitory computer-readable medium storing instructions which, when executed by one or more processors of a system for invoking a plug-in function, cause the system to perform the method for invoking plug-in functions.

BACKGROUND OF THE INVENTION

The background description provided herein is for the purpose of generally presenting the context of the present invention. Work of the presently named inventor, to the extent it is described in this background section, as well as aspects of the description that may not otherwise qualify as prior art at the time of filing, are neither expressly nor impliedly admitted as prior art against the present invention.

Currently, online games become more and more popular among users due to its flexibility without occupying memory storages for storing the games locally on a terminal such as computer devices, tablets, or smart phones. For the online games, it is not necessary for users to download the online games to the terminal. The online games can be started and played on a webpage without the need to occupy local memory space. With the increase of the number of the online game users, online game operators continuously develop new game functions to perfect the online games.

Conventionally, online game functions are perfected generally by adding new plug-ins. A new plug-in is a program written through an application programming interface complying with a certain criterion. During a specific execution process, the newly added plug-in is statically embedded into the webpage. When a user opens the webpage and learns that there is a need to install a plug-in, the user first downloads the plug-in from the webpage, and installs the plug-in after the download is completed. After the plug-in is installed, the webpage is usually refreshed to allow the plug-in to be used, so that perfection of the webpage is completed.

The need for refreshing webpage after a new plug-in is installed and the need to reload data in a process of refreshing the webpage may ruin the user experiences, reduce the webpage execution efficiency, and interrupt the online game.

Therefore, a heretofore unaddressed need exists in the art to address the aforementioned deficiencies and inadequacies.

SUMMARY OF THE INVENTION

Certain aspects of the present invention are directed to method and system for invoking a plug-in function, and a non-transitory computer-readable medium storing instructions which, when executed by one or more processors, cause the system to perform the method for invoking a plug-in function. According to the present invention, the execution efficiency of a webpage can be improved.

In one aspect of the present invention, the method for invoking a plug-in function includes detecting whether there exists a need to execute a function of a preset plug-in in an online game, and if there exists the need to execute the function of the preset plug-in in the online game, acquiring a type of a browser on which the online game is played; when the browser on which the online game is played is not a plug-in free browser, acquiring the preset plug-in and instantiating a refresh-free plug-in instance according to the preset plug-in; and invoking the refresh-free plug-in instance in the online game, and executing the function of the preset plug-in. The plug-in free browser can be, for example, an Internet Explorer® browser.

In one embodiment, before the step of acquiring the preset plug-in, the method further includes detecting whether a terminal has the preset plug-in; if not, prompting the terminal to download and install the preset plug-in; and if yes, directly executing the step of acquiring the preset plug-in.

In one embodiment, the step of instantiating the refresh-free plug-in instance according to the preset plug-in includes generating a container for containing the presser plug-in, and setting an identity (ID) of the container; and instantiating in the container a refresh-free plug-in instance for the preset plug-in, and generating an ID of the refresh-free plug-in instance according to the ID of the container.

In one embodiment, before the step of generating the container for containing the presser plug-in, the method further includes driving a counter to add a preset value to obtain a new count value, and setting the ID of the container using the new count value.

In one embodiment, the step of setting an ID of the container includes generating the ID of the container according to a name of the preset plug-in and the new count value.

In another aspect of the present invention, the system for invoking a plug-in function includes a detecting module, configured to detect whether there exists a need to execute a function of a preset plug-in in an online game, and if there exists the need to execute the function of the preset plug-in in the online game, acquire a type of a browser on which the online game is played; an instance instantiating module, configured to, when the browser on which the online game is played is a non-IE browser, acquire the preset plug-in and instantiate a refresh-free plug-in instance according to the preset plug-in; and an executing module, configured to invoke the refresh-free plug-in instance in the online game, and execute the function of the preset plug-in.

In one embodiment, the detecting module is further configured to detect whether a terminal has the preset plug-in, and if not, prompt the terminal to download and install the preset plug-in.

In one embodiment, the instance instantiating module includes a container generating unit, configured to generate a container for containing the presser plug-in, and set an ID of the container; and an instance instantiating unit, configured to instantiate in the container a refresh-free plug-in instance for the preset plug-in, and generate an ID of the refresh-free plug-in instance according to the ID of the container.

In one embodiment, the instance instantiating module further includes a drive unit, configured to drive a counter to add a preset value to obtain a new count value, and set the ID of the container using the new count value.

In one embodiment, the container generating unit includes a generating sub-unit, configured to generate the ID of the container according to a name of the preset plug-in and the new count value.

In a further aspect, the present invention, the non-transitory computer-readable medium stores instructions which, when executed by one or more processors, cause the intelligent terminal to perform the method for invoking a plug-in function.

According to the present invention, it is detected whether there exists a need to execute a function of a preset plug-in in an online game, and if there exists the need to execute the function of the preset plug-in in the online game, a type of a browser on which the online game is played is acquired; when the browser on which the online game is played is a non-IE browser, the preset plug-in is acquired and a refresh-free plug-in instance is instantiated according to the preset plug-in; and the refresh-free plug-in instance is invoked in the online game, and the function of the preset plug-in is executed. As such, the webpage does not need to be refreshed in the non-IE browser, and the function of the preset plug-in can be executed by instantiating the refresh-free plug-in instance, thereby improving the execution efficiency of the webpage.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the present invention.

DETAILED DESCRIPTION OF THE INVENTION

Figure 1:
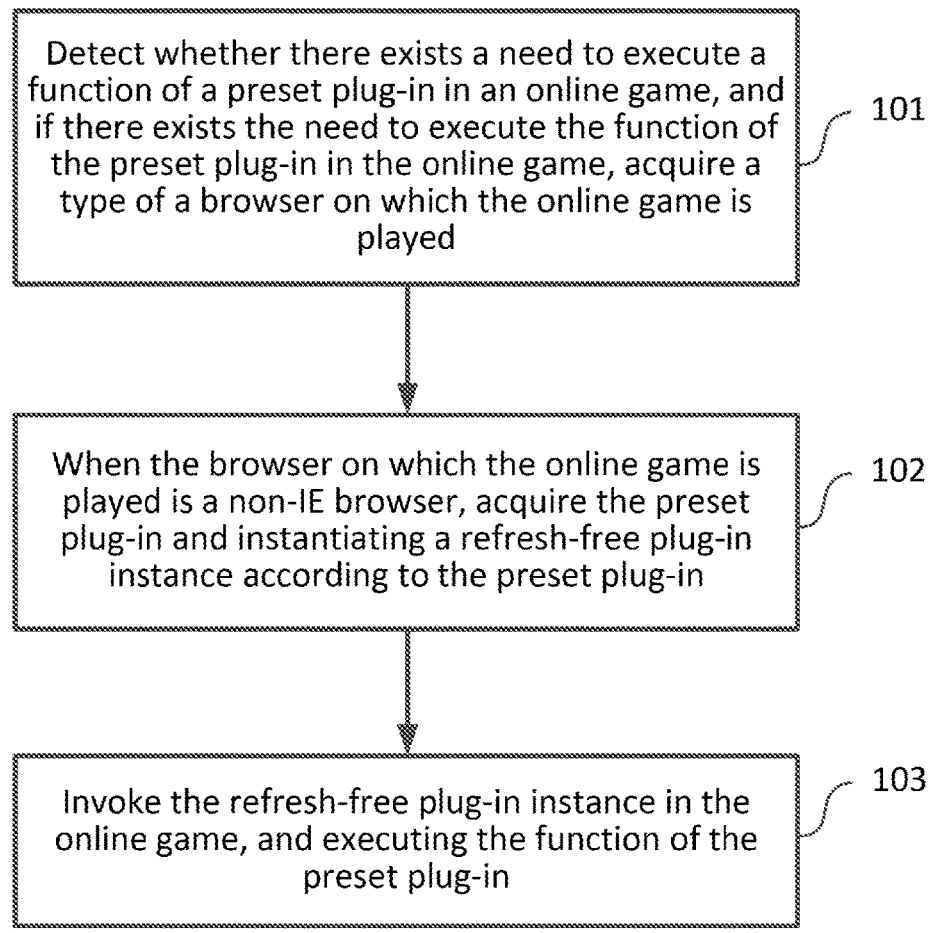
FIG. 1 is a flow chart of a method for invoking a plug-in function according one embodiment of the present invention.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are configured to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more operations within a method is executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules is executed using a single (shared) processor. In addition, some or all code from multiple modules is stored by a single (shared) memory. The term "group", as used herein, means that some or all code from a single module is executed using a group of processors. In addition, some or all code from a single module is stored using a group of memories.

The systems and methods described herein are implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Embodiments of the present invention are illustrated in detail hereinafter with reference to accompanying drawings in FIGS. 1-4. It should be understood that specific embodiments described herein are merely intended to explain the present invention, but not intended to limit the present invention. In accordance with the purposes of this invention, as embodied and broadly described herein, this invention, in certain aspects, relates to method and system for invoking plug-in functions without refreshing the webpage, and a non-transitory computer-readable medium storing instructions which, when executed by one or more processors, cause the system to perform the method for invoking plug-in functions.

A browser involved in certain embodiments of the present invention supports a KJava platform, and has a built-in JavaScript parsing engine which supports a JavaScript language. A terminal in certain embodiments of the present invention includes, but is not limited to, a smart system such as a personal computer, a smart phone, or a tablet, which is not specifically limited in the embodiments of the present invention.

Embodiment 1

Referring to FIG. 1, this embodiment provides a method for invoking a plug-in function, which includes the following steps.

At step 101, whether there exists a need to execute a function of a preset plug-in in an online game is detected. If there exists the need to execute the function of the preset plug-in in the online game, a type of a browser on which the online game is played is acquired.

At step 102, when the browser on which the online game is played is a non-IE browser, the preset plug-in is acquired and a refresh-free plug-in instance according to the preset plug-in is instantiated.

At step 103, the refresh-free plug-in instance in the online game is invoked, and the function of the preset plug-in is executed.

In one embodiment, before the step of acquiring the preset plug-in, the method further includes detecting whether a terminal has the preset plug-in; if not, prompting the terminal to download and install the preset plug-in; and if yes, directly executing the step of acquiring the preset plug-in.

In one embodiment, the step of instantiating a refresh-free plug-in instance according to the preset plug-in includes generating a container for containing the presser plug-in, and setting an ID (Identity, an identification number) of the container; and instantiating in the container a refresh-free plug-in instance for the preset plug-in, and generating an ID of the refresh-free plug-in instance according to the ID of the container.

In one embodiment, before the step of generating a container for containing the presser plug-in, the method further includes driving a counter to add a preset value to obtain a new count value, and setting the ID of the container using the new count value.

In one embodiment, the step of setting an ID of the container includes generating the ID of the container according to a name of the preset plug-in and the new count value.

According to the exemplary embodiment, it is detected whether there exists a need to execute a function of a preset plug-in in an online game, and if there exists the need to execute the function of the preset plug-in in the online game, a type of a browser on which the online game is played is acquired; when the browser on which the online game is played is a non-IE browser, the preset plug-in is acquired and a refresh-free plug-in instance is instantiated according to the preset plug-in; and the refresh-free plug-in instance is invoked in the online game, and the function of the preset plug-in is executed. As such, the webpage does not need to be refreshed in the non-IE browser, and the function of the preset plug-in can be executed by instantiating the refresh-free plug-in instance, thereby improving the execution efficiency of the webpage.

Embodiment 2

Figure 2:
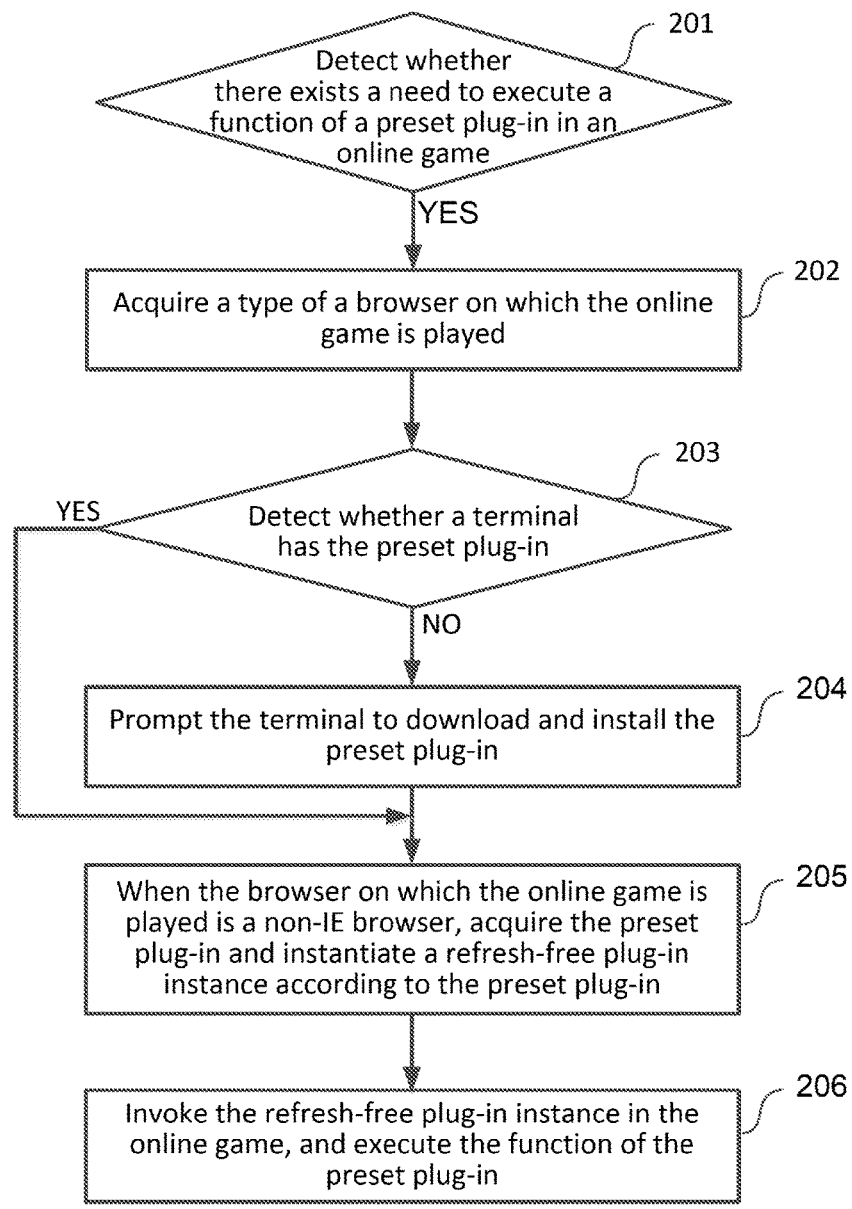
FIG. 2 is a flow chart of a method for invoking a plug-in function according another embodiment of the present invention.

This exemplary embodiment of the present invention provides a method for invoking a plug-in function, where a JavaScript parsing engine is added to the webpage. When a function of a preset plug-in needs to be invoked, the JavaScript parsing engine instantiates a refresh-free plug-in instance and executes the function of the preset plug-in. Referring to FIG. 2, the method includes the following steps.

At step 201, whether there exists a need to execute a function of a preset plug-in in an online game is detected. If yes, step 202 is executed; and otherwise, the detection continues.

In this step, after a user opens an online game, a function of a certain plug-in probably needs to be used in an execution process of the online game. If the function of the preset plug-in needs to be executed, the plug-in is invoked timely, so as to ensure normal operation of the webpage. The preset plug-in refers to any one or multiple plug-ins in the online game, which is not specifically limited in this embodiment.

At step 202, a type of a browser on which the online game is played is acquired.

The type of the browser includes, but is not limited to, an IE browser and a non-IE browser. This embodiment does not limit the type of the browser on which the online game is played. Different plug-in invoking processes are executed for different types of the browsers.

The type of the browser on which the online game is played can be acquired by a conventional method, which is not specifically limited in this embodiment.

At step 203, whether a terminal has the preset plug-in is detected. If yes, step 205 is executed; and otherwise, step 204 is executed.

In this exemplary embodiment, before the function of the preset plug-in is executed, whether the terminal has the plug-in is detected. In certain embodiments, whether the terminal has the preset plug-in may also be detected in real time, so as to timely prompt the user to download and install the preset plug-in. In certain embodiments of the execution process, the real-time detection method is adopted or it is detected whether the preset plug-in exists before the function of the preset plug-in is invoked, which are not specifically limited in this embodiment.

In certain embodiments, in detecting whether the terminal has the plug-in, the terminal is searched for an application program, so as to check whether the terminal has a file related to the plug-in. If the terminal does not have the plug-in, the user is prompted to download and install the plug-in. If the terminal has the plug-in, the plug-in is directly invoked.

At step 204, the terminal is prompted to download and install the preset plug-in. Specifically, when it is detected that the preset plug-in is not installed in the terminal, the user is prompted to download and install the plug-in. The user downloads the plug-in according to the prompt, and installs the plug-in in the local, so as to facilitate the invoking of the plug-in function in the online game.

At step 205: when the browser on which the online game is played is a non-IE browser, the preset plug-in is acquired and a refresh-free plug-in instance is instantiated according to the preset plug-in.

According to this process, after the type of the browser is acquired, the type of the browse is determined. If the type of the browser is a non-IE browser, the refresh-free plug-in instance is instantiated, so as to execute the function of the preset plug-in.

In one embodiment, the step of instantiating the refresh-free plug-in instance according to the preset plug-in includes generating a container for containing the presser plug-in, and setting an ID of the container; and instantiating in the container a refresh-free plug-in instance for the preset plug-in, and generating an ID of the refresh-free plug-in instance according to the ID of the container.

In one embodiment, the refresh-free plug-in instance is instantiated by using JavaScript, where the refresh-free plug-in instance refers to an invoking instance for the locally installed preset plug-in. After the preset plug-in is locally installed, the invoking the plug-in each time is an instance, where the instance refers to a specific application of the preset plug-in, and is a life cycle of each running of the preset plug-in.

In one embodiment, a counter is set in JavaScript. When a refresh-free plug-in instance is instantiated each time, the counter adds the preset value, where the preset value may be 1, 2, or 3, etc., which is not specifically limited in this embodiment. A count value of the counter may be configured to set an ID value of the container. As such, before the generating a container for containing the preset plug-in, the method further includes driving the counter to add the preset value, and then obtaining a new count value, and setting the ID of the container using the new count value. Correspondingly, the step of setting an ID of the container includes generating the ID of the container according to a name of the preset plug-in and the new count value.

For example, the name of the preset plug-in is XYZ, a value NumA is obtained after the addition by the counter, and a container DIV for containing the preset plug-in is generated. In one embodiment, the container DIV can be generated in a manner of document.createElement ('div'). After the container is generated, an ID of the container is set. Each container corresponds to one unique ID. In one embodiment, the ID of the container may be generated according to the name XYZ and the value NumA, for example, by using setAttribute ('id', XYZ+NumA).

After the container is generated, a refresh-free plug-in instance is instantiated in the container, that is, an object or an embed tag is generated. In one embodiment, an ID uniquely corresponding to the instance is generated for the instance according to the ID of the container. For example, the ID is GUID+XYZ+NumA; and then a plug-in is dynamically generated by rewriting innerHTML of div, where the rewritten content of innerHTML is: <object type="application/XYZ" id="GUID+XYZ+NumA"> </object>, thereby obtaining the refresh-free plug-in instance.

It should be noted that, according to this embodiment, for the non-IE browser, the refresh-free plug-in instance can be obtained through document.getElementById ("GUID+XYZ+NumA"). For the IE browser, an ActiveX plug-in can be instantiated by using JavaScript and invoking new ActiveXObject, and a function of the plug-in is executed, without the need of instantiating the refresh-free plug-in instance.

At step 206, the refresh-free plug-in instance in the online game is invoked, and the function of the preset plug-in is executed.

In one embodiment, for the non-IE browser, the online game does not need to be refreshed, the refresh-free plug-in instance can be obtained through document.getElementById ("GUID+XYZ+NumA"), and the function of the preset plug-in is implemented through the refresh-free plug-in instance, thereby improving the execution efficiency of the webpage.

According to the exemplary embodiment, it is detected whether there exists a need to execute a function of a preset plug-in in an online game. If there exists the need to execute the function of the preset plug-in in the online game, a type of a browser on which the online game is played is acquired. When the browser on which the online game is played is a non-IE browser, the preset plug-in is acquired and a refresh-free plug-in instance is instantiated according to the preset plug-in. Then, the refresh-free plug-in instance is invoked in the online game, and the function of the preset plug-in is executed. Accordingly, the webpage does not need to be refreshed in the non-IE browser, and the function of the preset plug-in can be executed by instantiating the refresh-free plug-in instance, thereby improving the execution efficiency of the webpage.

Embodiment 3

Figure 3:
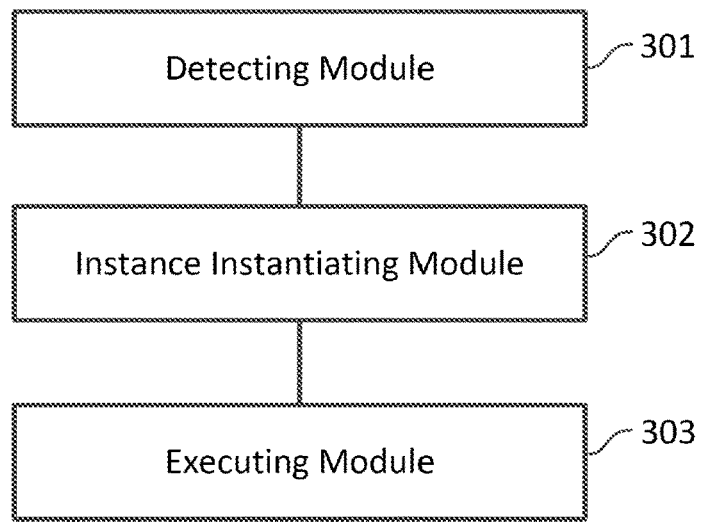
FIG. 3 is a schematic structural diagram of a system for invoking a plug-in function according one embodiment of the present invention.

Referring to FIG. 3, the exemplary embodiment of the present invention provides a system for invoking a plug-in function, which includes a detecting module 301, an instance instantiating module 302, and an executing module 303.

The detecting module 301 is configured to detect whether there exists a need to execute a function of a preset plug-in in an online game, and, if there exists the need to execute the function of the preset plug-in in the online game, acquire a type of a browser on which the online game is played.

The instance instantiating module 302 is configured to, when the browser on which the online game is played is a non-IE browser, acquire the preset plug-in and instantiate a refresh-free plug-in instance according to the preset plug-in.

The executing module 303 is configured to invoke the refresh-free plug-in instance in the online game, and execute the function of the preset plug-in.

In one embodiment, the detecting module 301 is further configured to detect whether a terminal has the preset plug-in, and if not, prompt the terminal to download and install the preset plug-in.

Figure 4:
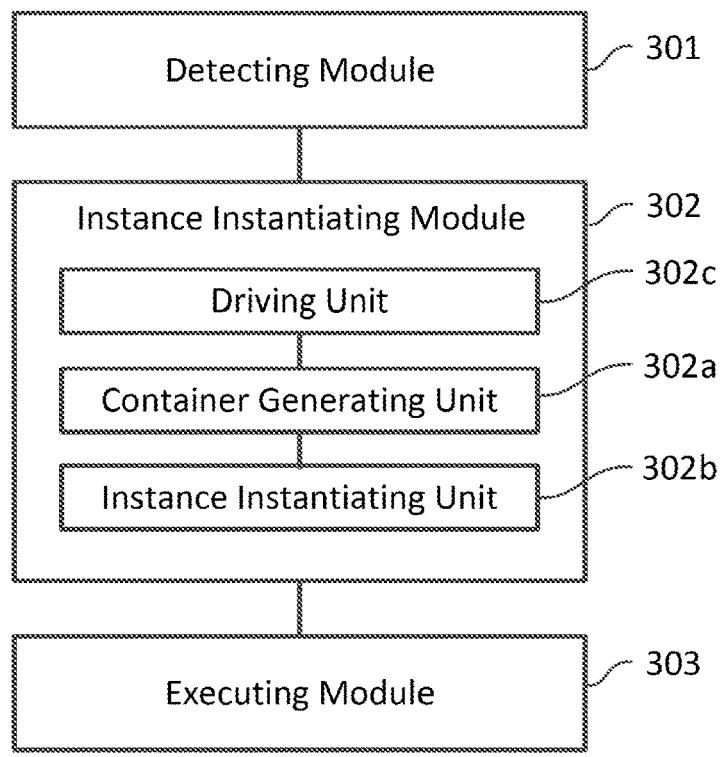
FIG. 4 is a schematic structural diagram of a system for invoking a plug-in function according another embodiment of the present invention.

In one embodiment, referring to FIG. 4, the instance instantiating module 302 includes a container generating unit 302a, configured to generate a container for containing the presser plug-in, and set an ID of the container; and an instance instantiating unit 302b, configured to instantiate in the container a refresh-free plug-in instance for the preset plug-in, and generate an ID of the refresh-free plug-in instance according to the ID of the container.

In one embodiment, referring to FIG. 4, the instance instantiating module 302 further includes a drive unit 302c, configured to drive a counter to add a preset value, and then obtain a new count value, and set the ID of the container using the new count value.

In one embodiment, the container generating unit 302a may include a generating sub-unit, configured to generate the ID of the container according to a name of the preset plug-in and the new count value.

According to this embodiment are as follows, it is detected whether there exists a need to execute a function of a preset plug-in in an online game. If there exists the need to execute the function of the preset plug-in in the online game, a type of a browser on which the online game is played is acquired. When the browser on which the online game is played is a non-IE browser, the preset plug-in is acquired and a refresh-free plug-in instance is instantiated according to the preset plug-in. Then, the refresh-free plug-in instance is invoked in the online game, and the function of the preset plug-in is executed. As such, the webpage does not need to be refreshed in the non-IE browser, and the function of the preset plug-in can be executed by instantiating the refresh-free plug-in instance, thereby improving the execution efficiency of the webpage.

It should be noted that, in the system for invoking a plug-in function provided in the foregoing embodiments, the functional modules are used as examples for illustration. In certain embodiments, the functions may be allocated to different functional modules for implementation, that is, an inner structure of the system is divided into different functional modules, so as to implement all or a part of the functions described above.

In addition, the system for invoking a plug-in function provided in the foregoing embodiments adopts a same concept as that in the method for invoking a plug-in function according to the embodiments. Reference is made to the method embodiment for the specific implementation process, and the details are not described in detail herein again.

The sequence numbers of the above embodiments of the present invention are merely for the convenience of description, and do not imply the preference among the embodiments.

It should be noted that all or a part of the steps according to the embodiments of the present invention is implemented by hardware or a program instructing relevant hardware. Yet another aspect of the invention provides a non-transitory computer readable storage medium/memory which stores computer executable instructions or program codes. The computer executable instructions or program codes enable a computer or a similar computing apparatus to complete various operations in the above disclosed method for invoking a plug-in function. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for invoking a plug-in function, comprising:
    detecting whether there exists a need to execute a function of a preset plug-in in an online game, and if there exists the need to execute the function of the preset plug-in in the online game, acquiring a type of a browser on which the online game is played;
    when the browser on which the online game is played is not a plug-in free browser, acquiring the preset plug-in and instantiating a refresh-free plug-in instance according to the preset plug-in, wherein the refresh-free plug-in instance is an application of the preset plug-in; and
    invoking the refresh-free plug-in instance in the online game, and executing the function of the preset plug-in, wherein the function of the preset plug-in is implemented through the refresh-free plug-in instance, thereby improving execution efficiency of a webpage.

2. The method according to claim 1, before the step of acquiring the preset plug-in, further comprising:
    detecting whether a terminal has the preset plug-in; if not, prompting the terminal to download and install the preset plug-in.

3. The method according to claim 1, wherein the step of instantiating a refresh-free plug-in instance according to the preset plug-in comprises:
    generating a container for containing the preset plug-in, and setting an identity (ID) of the container; and
    instantiating in the container a refresh-free plug-in instance for the preset plug-in, and generating an ID of the refresh-free plug-in instance according to the ID of the container.

4. The method according to claim 3, before the step of generating a container for containing the preset plug-in, further comprising:
    driving a counter to add a preset value to obtain a new count value, and setting the ID of the container using the new count value.

5. The method according to claim 4, wherein the step of setting an ID of the container comprises:
    generating the ID of the container according to a name of the preset plug-in and the new count value.

6. A system for invoking a plug-in function, comprising:
    a detecting module, configured to detect whether there exists a need to execute a function of a preset plug-in in an online game, and if there exists the need to execute the function of the preset plug-in in the online game, acquire a type of a browser on which the online game is played;
    an instance instantiating module, configured to, when the browser on which the online game is played is not a plug-in free browser, acquire the preset plug-in and instantiate a refresh-free plug-in instance according to the preset plug-in, wherein the refresh-free plug-in instance is an application of the preset plug-in; and
    an executing module, configured to invoke the refresh-free plug-in instance in the online game, and execute the function of the preset plug-in, wherein the function of the preset plug-in is implemented through the refresh-free plug-in instance, thereby improving execution efficiency of a webpage.

7. The system according to claim 6, wherein the detecting module is further configured to detect whether a terminal has the preset plug-in, and if not, prompt the terminal to download and install the preset plug-in.

8. The system according to claim 6, wherein the instance instantiating module comprises:
    a container generating unit, configured to generate a container for containing the preset plug-in, and set an ID of the container; and
    an instance instantiating unit, configured to instantiate in the container a refresh-free plug-in instance for the preset plug-in, and generate an ID of the refresh-free plug-in instance according to the ID of the container.

9. The system according to claim 8, wherein the instance instantiating module further comprises:

a drive unit, configured to drive a counter to add a preset value to obtain a new count value, and set the ID of the container using the new count value.

10. The system according to claim 9, wherein the container generating unit comprises:
   a generating sub-unit, configured to generate the ID of the container according to a name of the preset plug-in and the new count value.

11. A non-transitory computer-readable medium storing instructions which, when executed by one or more processors, cause a system to perform a method for invoking a plug-in function, the method comprising:
   detecting whether there exists a need to execute a function of a preset plug-in in an online game, and if there exists the need to execute the function of the preset plug-in in the online game, acquiring a type of a browser on which the online game is played;
   when the browser on which the online game is played is not a plug-in free browser, acquiring the preset plug-in and instantiating a refresh-free plug-in instance according to the preset plug-in, wherein the refresh-free plug-in instance is an application of the preset plug-in; and
   invoking the refresh-free plug-in instance in the online game, and executing the function of the preset plug-in, wherein the function of the preset plug-in is implemented through the refresh-free plug-in instance, thereby improving execution efficiency of a webpage.

12. The non-transitory computer-readable medium according to claim 11, wherein the method, before the step of acquiring the preset plug-in, further comprises:
   detecting whether a terminal has the preset plug-in; if not, prompting the terminal to download and install the preset plug-in.

13. The non-transitory computer-readable medium according to claim 11, wherein the step of instantiating a refresh-free plug-in instance according to the preset plug-in comprises:
   generating a container for containing the preset plug-in, and setting an identity (ID) of the container; and
   instantiating in the container a refresh-free plug-in instance for the preset plug-in, and generating an ID of the refresh-free plug-in instance according to the ID of the container.

14. The non-transitory computer-readable medium according to claim 13, wherein the method, before the step of generating a container for containing the preset plug-in, further comprises:
   driving a counter to add a preset value to obtain a new count value, and setting the ID of the container using the new count value.

15. The non-transitory computer-readable medium according to claim 14, wherein the step of setting an ID of the container comprises:
   generating the ID of the container according to a name of the preset plug-in and the new count value.

* * * * *